US008621055B2

(12) United States Patent
Lee et al.

(10) Patent No.: US 8,621,055 B2
(45) Date of Patent: Dec. 31, 2013

(54) APPARATUS AND METHOD FOR ACCESSING A NETWORK IN A WIRELESS TERMINAL

(75) Inventors: Keum-Koo Lee, Seongnam-si (KR); Hee-Jeong Choo, Anyang-si (KR); Ju-Yun Sung, Seoul (KR); Ji-Young Kwahk, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 201 days.

(21) Appl. No.: 12/915,907

(22) Filed: Oct. 29, 2010

(65) Prior Publication Data

US 2011/0106930 A1 May 5, 2011

(30) Foreign Application Priority Data

Oct. 30, 2009 (KR) ........................ 10-2009-0104531

(51) Int. Cl.
*G06F 15/16* (2006.01)
(52) U.S. Cl.
USPC ......... 709/223; 709/227; 370/331; 455/435.2
(58) Field of Classification Search
USPC .......... 709/200–202, 223, 224, 227; 455/436, 455/456.1, 435.2; 370/331
See application file for complete search history.

(56) References Cited

U.S. PATENT DOCUMENTS

| | | | | |
|---|---|---|---|---|
| 7,242,950 B2 * | 7/2007 | Suryanarayana et al. | . | 455/456.5 |
| 7,363,379 B2 * | 4/2008 | Tejaswini et al. | ............. | 709/227 |
| 7,657,594 B2 * | 2/2010 | Banga et al. | ................... | 709/203 |
| 7,768,963 B2 * | 8/2010 | Alizadeh-Shabdiz | ........ | 370/328 |
| 7,792,526 B2 * | 9/2010 | Salomone | ...................... | 455/434 |
| 8,126,476 B2 * | 2/2012 | Vardi et al. | .................. | 455/456.1 |
| 8,144,673 B2 * | 3/2012 | Alizadeh-Shabdiz | ........ | 370/338 |
| 8,185,129 B2 * | 5/2012 | Alizadeh-Shabdiz | ..... | 455/456.1 |
| 8,270,998 B2 * | 9/2012 | Suryanarayana et al. | . | 455/456.5 |
| 2004/0205158 A1 | 10/2004 | Hsu | | |
| 2006/0104245 A1 * | 5/2006 | Narayanaswami et al. | ... | 370/332 |
| 2006/0135068 A1 | 6/2006 | Jaakkola et al. | | |
| 2006/0265507 A1 * | 11/2006 | Banga et al. | ................... | 709/228 |
| 2007/0025293 A1 * | 2/2007 | Choi | ............................. | 370/331 |
| 2007/0194985 A1 * | 8/2007 | Monnerat | ................ | 342/357.09 |
| 2007/0232329 A1 * | 10/2007 | Suryanarayana et al. | . | 455/456.5 |
| 2007/0263558 A1 * | 11/2007 | Salomone | ...................... | 370/318 |
| 2008/0008121 A1 * | 1/2008 | Alizadeh-Shabdiz | ........ | 370/328 |
| 2008/0014934 A1 | 1/2008 | Balasubramanian et al. | | |
| 2008/0096580 A1 | 4/2008 | Montemurro | | |
| 2008/0117875 A1 * | 5/2008 | Bennett et al. | ................. | 370/331 |
| 2008/0293405 A1 * | 11/2008 | Meyer | .......................... | 455/432.1 |
| 2009/0042557 A1 * | 2/2009 | Vardi et al. | .................. | 455/422.1 |
| 2009/0061870 A1 * | 3/2009 | Finkelstein et al. | ........ | 455/435.2 |
| 2009/0138921 A1 * | 5/2009 | Miyata | ............................ | 725/80 |

(Continued)

FOREIGN PATENT DOCUMENTS

| | | |
|---|---|---|
| KR | 1020050104390 | 11/2005 |
| KR | 1020070095958 | 10/2007 |
| KR | 1020090039776 | 4/2009 |

*Primary Examiner* — Moustafa M Meky
(74) *Attorney, Agent, or Firm* — The Farrell Law Firm, P.C.

(57) ABSTRACT

An apparatus and method for quickly searching for an accessible network in a wireless terminal. A wireless terminal registers information about a current location and information used to access a network in an access history table, when it succeeds in accessing the network. Thereafter, when accessing a network, the wireless terminal attempts to access a network that it previously accessed, using information about a current location and the access history table.

18 Claims, 3 Drawing Sheets

(56) References Cited

U.S. PATENT DOCUMENTS

| | | | |
|---|---|---|---|
| 2010/0082775 A1* | 4/2010 | Banga et al. | 709/219 |
| 2010/0118847 A1* | 5/2010 | Lee et al. | 370/338 |
| 2010/0265844 A1* | 10/2010 | Salomone | 370/252 |
| 2012/0309429 A1* | 12/2012 | Suryanarayana et al. | 455/456.5 |

\* cited by examiner

APPARATUS AND METHOD FOR ACCESSING A NETWORK IN A WIRELESS TERMINAL

PRIORITY

This application claims priority under 35 U.S.C. §119(a) to a Korean Patent Application filed in the Korean Intellectual Property Office on Oct. 30, 2009 and assigned Serial No. 10-2009-0104531, the entire disclosure of which is hereby incorporated by reference.

BACKGROUND OF THE INVENTION

1. Field of the Invention

The present invention relates generally to an apparatus and method for accessing a network in a wireless terminal and, more particularly, to an apparatus and method for expedited searching for an accessible network in a wireless terminal.

2. Description of the Related Art

Extensive research has been conducted to support an enhanced high-speed data service over a voice-oriented wireless network in $4^{th}$ Generation (4G) communication standards, Long Term Evolution (LTE), and Worldwide interoperability for Microwave Access (WiMAX).

FIG. 1 illustrates a procedure for accessing an Access Point (AP) over a general WLAN in a wireless terminal. The procedure illustrated in FIG. 1 complies with the WLAN standard, Institute of Electrical and Electronics Engineers (IEEE) 802.11.

Referring to FIG. 1, a terminal 100 transmits a Probe Request message in order to search for an adjacent AP, that is, an accessible AP in step 110. The Probe Request message is broadcast to unknown adjacent APs. The broadcast is repeated at every predetermined interval until an accessible AP is detected.

Upon receipt of the Probe Request message from the terminal 100, a candidate AP 102 replies to the terminal 100 with a Probe Response message in step 120.

The terminal 100 searches for candidate APs over all channels and selects an AP in the best channel state from among candidate APs 120 that have transmitted the Probe Response message to the terminal 100.

Upon selection of the best AP, the terminal 100 performs an authentication procedure with the selected AP. If the authentication is successful, the terminal 100 exchange signals with the selected AP to associate itself with the selected AP.

If the terminal 100 is associated with the selected AP after succeeding in the authentication, the terminal 100 may receive a wireless communication service from the selected AP.

Specifically, such a high-speed data service may not face great spatial limitations because it is provided over an existing wireless network. However, the cost of using the existing wireless networks is a constraint.

For example, when multiple networks are available, a user generally attempts to access a less expensive network. However, if the user fails to access the less expensive network, the user then accesses a more expensive network.

Due to a relatively high spatial constraint that a relatively inexpensive network typically imposes, users want to quickly determine whether they can access desired networks at their user current locations.

Accordingly, a need exists for a method for quickly searching for an accessible network at a current location with a wireless terminal.

SUMMARY OF THE INVENTION

Accordingly, the present invention is designed to address at least the above-described problems and/or disadvantages and to provide at least the advantages described below. An aspect of the present invention is to provide an apparatus and method for managing an access history based on location information about previously accessed networks, for a fast network search in a wireless terminal.

Another aspect of the present invention is to provide an apparatus and method for quickly searching for an accessible network based on an access history in a wireless terminal.

Another aspect of the present invention is to provide an apparatus and method for quickly searching for an accessible network according to a current location and location information managed based on an access history, and accessing the detected network in a wireless terminal.

Another aspect of the present invention is to provide an apparatus and method for determining whether there is an accessible Access Point (AP), referring to a previous access history, before searching for an accessible AP at a current location in a wireless terminal.

In accordance with an aspect of the present invention, a method is provided for accessing an Access Point (AP) in a terminal supporting Wireless Local Area Network (WLAN) communication. In the method, the terminal searches for an accessible AP in pre-registered access history information, using information about a current location of the terminal, and attempts, upon detection of an accessible AP, to access the detected AP.

In accordance with another aspect of the present invention, there a terminal apparatus for searching for an AP is provided. In the apparatus, a memory stores pre-registered access history information, an AP detector searches for an accessible AP in the pre-registered access history information, using information about a current location of the terminal, a communication module attempts to access an AP detected by the AP detector, and a controller controls the detection of the accessible AP and the attempt to access the detected AP.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Hereinafter, various embodiments of the present invention will be described with reference to the accompanying drawings. In the following description, a detailed description of known functions and configurations incorporated herein will be omitted when it may obscure the subject matter of the present invention. Further, various specific definitions found in the following description are provided only to help a general understanding, and it is apparent to those skilled in the art that the various embodiments of the present invention can be implemented without such definitions.

While various embodiments of the present invention will be described below with reference to a target network is an AP of a Wireless Local Area Network (WLAN), by way of example, this should not be construed as limiting the present invention. Specifically, it should be clearly understood that the present invention is applicable to other communication networks.

Figure 2:
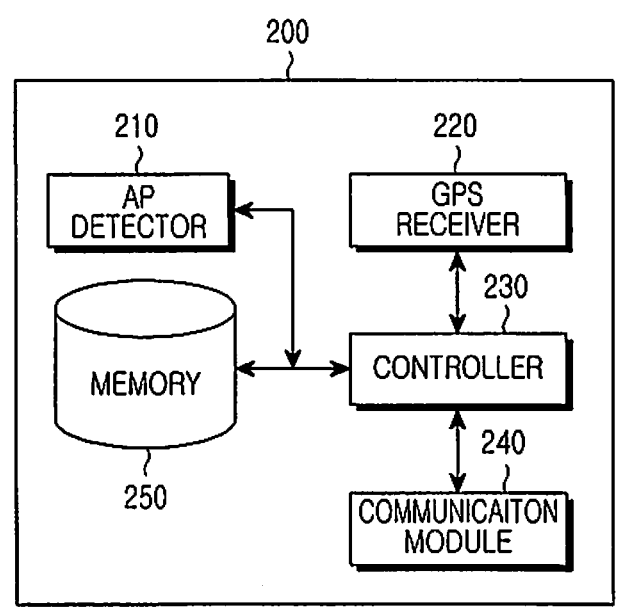
FIG. 2 is a block diagram of a wireless terminal according to an embodiment of the present invention.

FIG. 2 is a block diagram of a wireless terminal according to an embodiment of the present invention. Specifically, FIG. 2 illustrates a wireless terminal 200 supporting WLAN communication to detect its current location. Accordingly, the wireless terminal 200 includes a Global Positioning System (GPS) receiver 220.

Alternatively, instead of determining its own location, a wireless terminal may receive location information from an external source. Accordingly, when the wireless terminal receives location information from an external source, the wireless terminal does not need to use an additional component such as the GPS receiver 220.

For example, the wireless terminal may receive its location information over a commercial network that does not have a great geographical limitation, other than a target network. This function is typically supported by a cellular phone. In addition, a technique for estimating the location of a wireless terminal using a Base Station (BS) in a cellular network may be employed. As the actual method used for determining the location of the wireless terminal is not of great importance to the present invention, most location estimation techniques for a cellular network may be used.

In fact, with accurate knowledge of a current location, a user of the wireless terminal may even enter the current location on a User Interface (UI). If the wireless terminal stores location information (e.g. latitude and longitude coordinates) corresponding to address information, the user may easily acquire location information by entering rough information about an address.

Further, when the user is moving in a vehicle, the user may use location information with the aid of a navigator, e.g., GPS, equipped in the vehicle. The user may also acquire his or her location information through a map service over the Internet.

Figure 1:
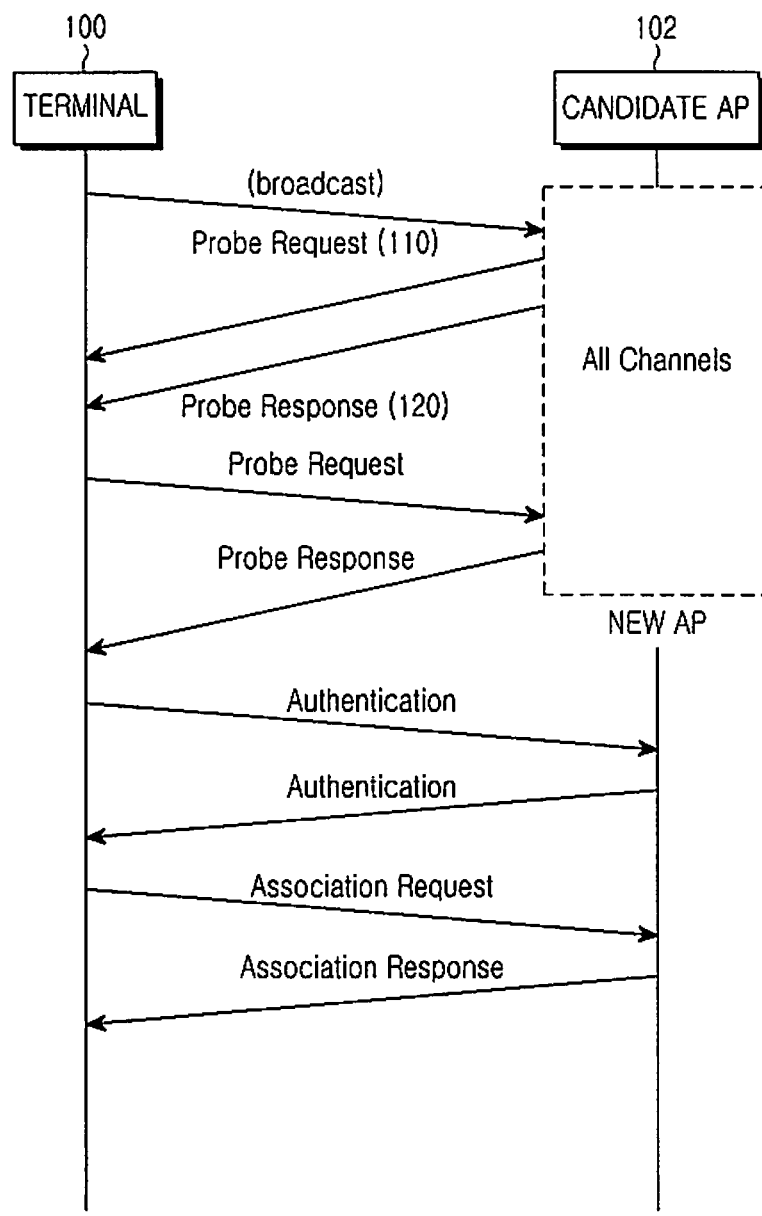
FIG. 1 is a diagram illustrating a signal flow for a conventional operation of a wireless terminal accessing an Access Point (AP)

Referring to FIG. 2, in the absence of an access history table, an AP detector 210 searches for an accessible AP in a general procedure for WLAN communication under the control of a controller 230, e.g., the procedure illustrated in FIG. 1. However, when there is an access history table, the AP detector 210 searches for an accessible AP based on a current location of the wireless terminal 200 and location information included in the access history table.

For example, the AP detector 210 determines whether the current location of the wireless terminal 200 or information about a location near to the current location has been registered in the access history table. That is, depending on system performance requirements, the AP detector 210 can search the access history table for information about the exact location as the current location or the AP detector 210 determines whether there is information in the access history table about a location within a predetermined error range from the current location of the wireless terminal 200.

For example, the predetermined error range may be a distance within which a communication service from an AP is available. In addition, the predetermined error range may be adjusted, in accordance with an access success rate based on the access history table. Accordingly, to increase an access success rate using the access history table, the error range is set to be narrow, and to decrease an access success rate using the access history table, the error range is set to be wide.

Upon detection of information about a location within the predetermined error range from the current location in the access history table, the AP detector 210 determines that an accessible AP exists around the wireless terminal 200. Thereafter, the AP detector 210 requests the controller 230 to access the AP.

If information about a plurality of locations within the predetermined error range is detected, the AP detector 210 may select one of the locations. For example, the AP detector 210 may select information about a location nearest to the current location. If communication quality information is registered along with location information in the access history table, the AP detector 210 may select information about a location having the best communication quality from among the plurality of locations.

Additionally, the AP detector 210 may search for an accessible AP or attempt to access an AP for each of the plurality of locations.

However, when there is no information about a location within the predetermined error range from the location in the access history table, the AP detector 210 may search for an accessible AP in the general procedure for WLAN communication, as illustrated in FIG. 1, under the control of the controller 230.

In accordance with another embodiment of the present invention, if the AP detector 210 fails to detect information about a location within the error range from the current location, the AP detector 210 may attempt to search for location information by increasing the error range.

The GPS receiver 220 receives GPS signals from GPS communication satellites and generates information about the current location using the GPS signals. Thereafter, the GPS receiver 220 provides the information about the current location to the controller 230.

As described above, how the wireless terminal 200 determines its current location is not limited in the present invention. For example, the information about the current location of the wireless terminal 200 may be received from another network or the user, instead of the GPS receiver 220. In this case, the GPS receiver 220 does not need to be included in the wireless terminal 200. Accordingly, any known method for acquiring location information of the wireless terminal 200 can be used.

Upon receipt of a request for searching for a new AP, the controller 230 provides the information about the current location received from the GPS receiver 220 and the access history table stored in a memory 250 to the AP detector 210. In addition, the controller 230 commands the AP detector 210 to search for an accessible AP using the information about the current location and the access history table.

Upon detection of an accessible AP at the AP detector 210, the controller 230 performs a control operation for accessing the detected AP. However, if no accessible AP is detected at the AP detector 210, the controller 230 performs a control operation for searching for an accessible AP in a general procedure, as illustrated in FIG. 1 above.

If succeeding in accessing an AP in the general procedure, the controller 230 updates the access history table using the information about the current location. Even when accessing an AP using the access history table, the controller 230 may update the access history table using the information about the current location. Further, the controller 230 may register all information that can be used for accessing an AP, such as communication quality information, in addition to location information in the access history table.

Although not illustrated in FIG. 2, the controller 230 may register location information received through a UI in the access history table. The location information registered in the access history table may be information about the location of an AP known to the user or managed in a database. For example, information about the location of an AP, which is accurately known to the user, or information about a location where the user often uses a wireless communication service may be registered in the access history table through a UI.

If failing to access the detected AP after the attempt to access the detected AP using the access history table, the controller 230 registers the detected AP as inaccessible at the current location in the access history table, thereby preventing another attempt to access the AP from the same location at a later time.

If the information about the current location is almost the same as location information included in the access history table, it is determined that an AP accessed at a location indicated by the location information has been eliminated. Hence, the location information is deleted from the access history table.

The controller 230 controls a communication module 240 to attempt an access to a detected AP or to wirelessly communicate with an accessed AP. For example, the controller 230 controls the communication module 240 to transmit or receive a signal for a general AP search procedure as illustrated in FIG. 1. Upon receipt of a signal at the communication module 240 according to the general AP search procedure, the controller 230 may transmit the received signal to the AP detector 210 so that the AP detector 210 searches for an accessible AP.

The communication module 240 transmits or receives a signal for the general AP search procedure under the control of the controller 230. The communication module 240 also attempts to access an accessible AP and, if the attempt is successful, wirelessly communicates with the accessed AP, under the control of the controller 230.

In accordance with another embodiment of the present invention, the AP detector 210 may select the best AP according to a different criterion. For example, the best AP may be an AP having least traffic.

As described above, when the wireless terminal 200 successfully accesses the new AP, it updates the access history table with the information about the current location. If an accessible AP is selected based on the access history, the procedure for searching for candidate APs may not be performed, thereby decreasing time taken to access an AP. For example, when accessing an AP, the wireless terminal 200 performs an authentication procedure with an AP detected using the access history table, without searching for candidate APs.

Figure 3:
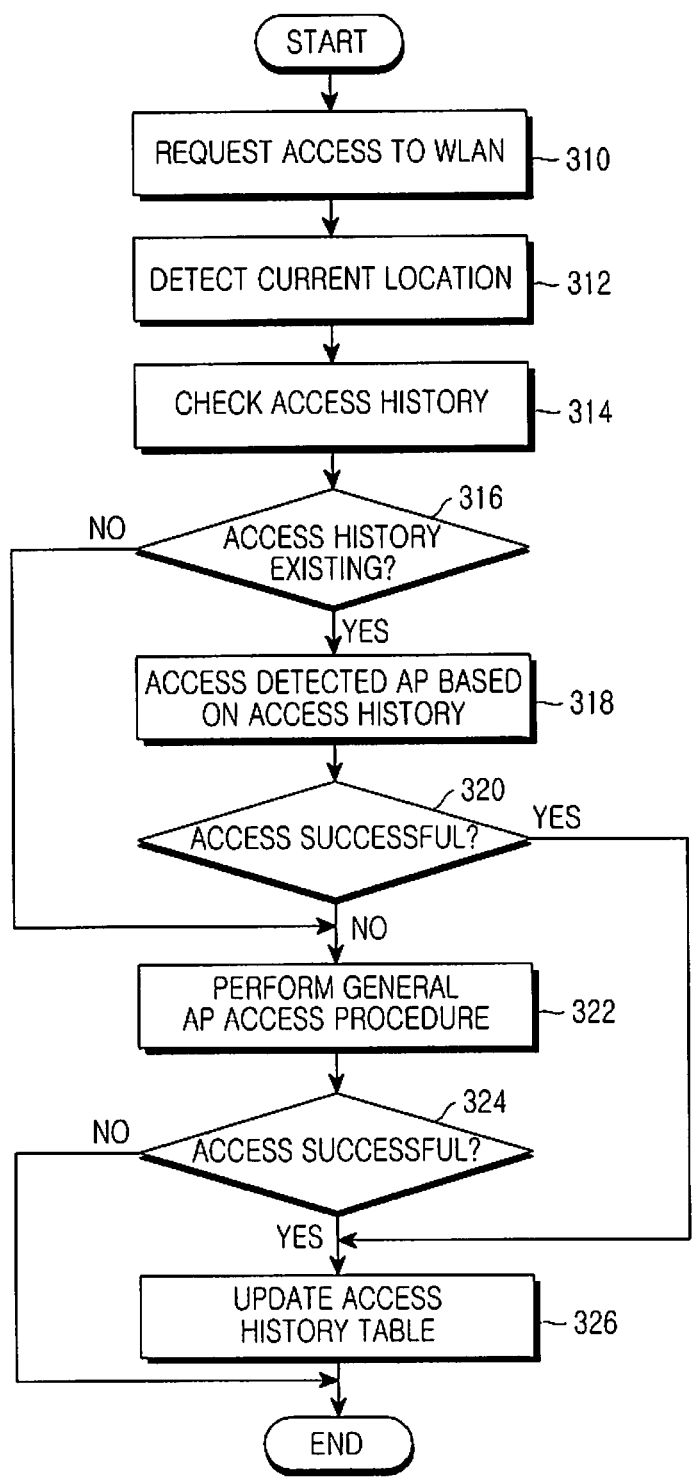
FIG. 3 is a flowchart illustrating a control operation for accessing an AP in a wireless terminal according to an embodiment of the present invention.

FIG. 3 is a flowchart illustrating a control operation for accessing an AP in a wireless terminal according to an embodiment of the present invention.

Referring to FIG. 3, the wireless terminal requests access to a WLAN in step 310. The access request may be generated when the wireless terminal is powered on, when the wireless terminal moves out of the service area of an old AP, or when a user of the wireless terminal requests a wireless communication service.

In step 312, the wireless terminal determines its current location. As described above, while the wireless terminal locates itself using GPS signals herein, information about the current location of the wireless terminal may be received from another network accessible at the current location or the user.

In step 314, the wireless terminal checks an access history table for an access history. The presence or absence of the access history may be determined according to the current location and the access history table. As described above, the access history table includes information about locations at which the wireless terminal has accessed APs. The access history table may further include identification information about the APs, data rates supported by the APs, authentication information about the APs, etc., with respect to the location information about the APs.

More specifically, the wireless terminal detects information about locations within a predetermined error range from the current location in the location information included in the access history table. The error range may be determined, taking into account a distance that an AP can cover. The determination is made in this manner to assume the presence of an AP at a location registered in the access history table because the location of the AP cannot be determined accurately. To minimize an error, the error range may be determined to be narrower than a typical AP covers. However, if the error range is too small, the probability of accessing a detected AP may increases, but the probability of detecting an AP accessible at the current location in the access history table decreases.

Accordingly, the error range may be determined based on the density of APs, the coverage of the APs, etc.

In step 316, the wireless terminal determines whether any location information is detected in the access history table based on the information about the current location. When location information is detected, the wireless terminal attempts to access an AP that was accessed at a location indicated by the location information in step 318.

More specifically, if information about a single location is detected, the wireless terminal attempts to access an AP indicated by the information about the single location. However, if information about a plurality of locations is detected from the access history table, the wireless terminal schedules accessing APs that the wireless terminal has been associated with at the locations. For example, the wireless terminal may attempt to access the APs in a descending order of the distance from the current location or in a descending order of communication quality.

In step 320, the wireless terminal determines whether the attempt to access the selected AP is successful.

If the wireless terminal fails to access the AP or if no access history has been detected based on the information about the current location, in step 322, the wireless terminal performs a general AP access procedure, as illustrated in FIG. 1. Thereafter, the wireless terminal determines whether it has succeeded in accessing an AP in step 324.

Upon successfully accessing an AP in step 320 or 324, in step 326, the wireless terminal updates the access history table using the information about the current location, information about the accessed AP, and information related to the access.

If the accessed AP retains information about adjacent APs, the wireless terminal may receive the information about the adjacent APs and register the information about the adjacent APs in the access history table. During registration, the wireless terminal may group the information about the adjacent APs with the information about the accessed AP. Therefore, when at least one of the grouped APs is detected, the APs of the same group may be considered to be candidate APs. Accordingly, the probability of accessing an AP in the wireless terminal increases.

In accordance with an embodiment of the present invention, the control operation for accessing an AP can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Moreover, while not required in all aspects, one or more units of a master device and the user terminal can include a processor or microprocessor executing a computer program stored in a computer-readable medium.

While the above-described embodiments of the present invention have been described on the premise that a terminal initiates a communication service, the AP accessing method described above is also applicable to a terminal roaming to another AP while it is receiving a communication service from a specific AP.

While certain embodiments of the present invention have been shown and described with reference to the drawings, it will be understood by those skilled in the art that various changes in form and details may be made therein without departing from the spirit and scope of the inventive concept as defined by the appended claims and their equivalents.

What is claimed is:

1. A method for accessing an Access Point (AP) in a terminal supporting Wireless Local Area Network (WLAN) communication, the method comprising:
   detecting a current location of the terminal;
   searching information about a registered location within a predetermined error range from the detected current location in pre-registered access history information stored in the terminal;
   upon search of the information about the registered location, detecting an accessible AP in the pre-registered access history information based on the searched information about the registered location; and
   attempting to access the detected AP,
   wherein the pre-registered access history information includes information about registered locations at which the terminal has accessed APs, and identification information about a previously accessed AP at each of the registered locations.

2. The method of claim 1, wherein the predetermined error range is a distance within which a communication service is available from the detected AP.

3. The method of claim 1, further comprising, updating the access history information using the information about the current location and information about the detected AP, if attempting to access the detected AP is successful.

4. The method of claim 1, further comprising:
   determining that roaming to another AP is needed while the terminal is connected to the detected AP; and
   searching for a target AP for roaming, using the pre-registered access history information and updated current location information.

5. The method of claim 1, further comprising:
   receiving information about an adjacent AP from the detected AP, after accessing; and
   updating the access history information using the information about the adjacent AP.

6. The method of claim 1, further comprising:
   if information about a plurality of registered locations is detected from the pre-registered access history information, scheduling an attempt to access the plurality of registered locations.

7. A non-transitory computer readable recording medium having recorded thereon a program executable by a computer for performing a method for accessing an Access Point (AP) in a terminal supporting Wireless Local Area Network (WLAN) communication, the method comprising:
   detecting a current location of the terminal;
   searching information about a registered location within a predetermined error range from the detected current location in pre-registered access history information stored in the terminal;
   upon search of the information about the registered location, detecting an accessible AP in the pre-registered access history information based on the searched information about the registered location; and
   attempting to access the detected AP,
   wherein the pre-registered access history information includes information about registered locations at which the terminal has accessed APs, and identification information about a previously accessed AP at each of the registered locations.

8. The medium of claim 7, wherein the predetermined error range is a distance within which a communication service is available from the detected AP.

9. The medium of claim 7, further comprising, updating the access history information using the information about the current location and information about the detected AP, if attempting to access the detected AP is successful.

10. The medium of claim 7, further comprising:
    determining that roaming to another AP is needed while the terminal is connected to the detected AP; and
    searching for a target AP for roaming, using the pre-registered access history information and updated current location information.

11. The medium of claim 7, further comprising:
    receiving information about an adjacent AP from the detected AP, after accessing; and
    updating the access history information using the information about the adjacent AP.

12. The medium of claim 7, wherein the method further comprises:
    if information about a plurality of registered locations is detected from the pre-registered access history information, scheduling an attempt to access the plurality of registered locations.

13. A terminal apparatus for searching for an Access Point (AP), comprising:
    a memory for storing pre-registered access history information;
    an AP detector for detecting a current location of the terminal, and searching information about a registered location within a predetermined error range from the detected current location in the pre-registered access history information, and upon search of the information about the registered location, detecting an accessible AP in the pre-registered access history information based on the searched information about the registered location; and
    a communication module for attempting to access an AP detected by the AP detector, wherein the pre-registered access history information includes information about registered locations at which the terminal has accessed APs, and identification information about a previously accessed AP at each of the registered locations.

14. The terminal apparatus of claim 13, wherein the predetermined error range is a distance within which a communication service is available from the detected AP.

15. The terminal apparatus of claim 13, further comprising a controller that updates the access history information using the information about the current location and information about an accessed AP.

16. The terminal apparatus of claim 13, wherein if roaming to another AP is needed while the terminal is connected to the detected AP, the AP detector searches for a target AP for roaming, using the pre-registered access history information and updated current location information.

17. The terminal apparatus of claim 13, further comprising a controller that receives information about an adjacent AP from an accessed AP and updates the access history information using the information about the adjacent AP.

18. The terminal apparatus of claim 13, wherein if information about a plurality of registered locations is detected from the pre-registered access history information, the AP detector schedules an attempt to access the plurality of registered locations.

* * * * *